(12) United States Patent
Shin et al.

(10) Patent No.: US 10,878,044 B2
(45) Date of Patent: Dec. 29, 2020

(54) SYSTEM AND METHOD FOR PROVIDING CONTENT RECOMMENDATION SERVICE

(71) Applicant: SK PLANET CO., LTD., Seongnam-si (KR)

(72) Inventors: Woo Young Shin, Seoul (KR); Dong Wook Cha, Seongnam-si (KR); Hye Ryeong Kim, Seoul (KR); Sang Youn Lee, Seoul (KR); Byung Chul Yoo, Seongnam-si (KR)

(73) Assignee: SK PLANET CO., LTD., Seongnam-si (KR)

( * ) Notice: Subject to any disclaimer, the term of this patent is extended or adjusted under 35 U.S.C. 154(b) by 1275 days.

(21) Appl. No.: 14/406,630

(22) PCT Filed: Jul. 31, 2013

(86) PCT No.: PCT/KR2013/006921
§ 371 (c)(1),
(2) Date: Dec. 9, 2014

(87) PCT Pub. No.: WO2014/069755
PCT Pub. Date: May 8, 2014

(65) Prior Publication Data
US 2015/0154303 A1    Jun. 4, 2015

(30) Foreign Application Priority Data

Oct. 30, 2012  (KR) .......................... 10-2012-0121239
Nov. 5, 2012   (KR) .......................... 10-2012-0123961

(51) Int. Cl.
*G06F 16/9535* (2019.01)
(52) U.S. Cl.
CPC ................................ *G06F 16/9535* (2019.01)
(58) Field of Classification Search
CPC .................................................... G06F 16/9535
See application file for complete search history.

(56) References Cited

U.S. PATENT DOCUMENTS

2003/0182277 A1 * 9/2003 Kurakake .......... G06F 17/30867
2009/0150491 A1 * 6/2009 Yamamoto .......... G06F 17/3002
                                                                  709/204
(Continued)

FOREIGN PATENT DOCUMENTS

CN            1324045 A      11/2001
CN          101196898 A       6/2008
(Continued)

OTHER PUBLICATIONS

International Search Report for PCT/KR2013/006921 dated Nov. 7, 2013, (Continued)

*Primary Examiner* — James Trujillo
*Assistant Examiner* — Kurt A Mueller
(74) *Attorney, Agent, or Firm* — Fenwick & West LLP

(57) ABSTRACT

The present invention relates to a system and method for providing a content recommendation service, including: a user terminal which transmits a content recommendation request signal including a copied keyword to a service providing device when a keyword is copied in a currently displayed page, which receives contents matched with the keyword from the service providing device and displays the contents on a notification bar, and which executes the specific contents and simultaneously registers the specific contents to a board of a corresponding content-type when the execution of specific contents is requested; and the service providing device which searches a prepared content DB in order to obtain contents matched with the keyword and transmits the obtained contents to the user terminal when the content recommendation request signal is received from said terminal.

5 Claims, 8 Drawing Sheets

(56) References Cited

U.S. PATENT DOCUMENTS

| | | | | |
|---|---|---|---|---|
| 2010/0138292 A1* | 6/2010 | Park | ................. | G06F 17/30997 |
| | | | | 705/14.46 |
| 2010/0306146 A1* | 12/2010 | Brown | .............. | G06F 17/30867 |
| | | | | 706/45 |
| 2013/0086159 A1* | 4/2013 | Gharachorloo | ........ | G06Q 50/01 |
| | | | | 709/204 |

FOREIGN PATENT DOCUMENTS

| | | | |
|---|---|---|---|
| CN | 101238730 | A | 8/2008 |
| CN | 101311928 | A | 11/2008 |
| CN | 101551825 | A | 10/2009 |
| CN | 102053971 | A | 5/2011 |
| JP | 2007102767 | A | 4/2007 |
| JP | 2008257655 | A | 10/2008 |
| KR | 100940981 | B1 | 2/2010 |
| KR | 1020110039120 | A | 4/2011 |
| KR | 1020120007829 | A | 1/2012 |
| KR | 1020120073179 | A | 7/2012 |

OTHER PUBLICATIONS

Chinese Office Action dated Nov. 4, 2016 corresponding to Chinese Application No. CN 201380031576.8.

* cited by examiner

SYSTEM AND METHOD FOR PROVIDING CONTENT RECOMMENDATION SERVICE

TECHNICAL FIELD

The present invention relates to a system and method for providing content recommendation service and, more particularly, to a system and method for providing content recommendation service, wherein when the copying of a keyword is executed in a currently displayed page, a content recommendation request signal including the copied keyword is transmitted to a service providing apparatus and pieces of content matched with the keyword are received from the service providing apparatus and are displayed in a notification bar, and when the execution of specific content of the pieces of displayed content is requested, the specific content is executed and simultaneously the specific content is registered with the board of a corresponding content type.

BACKGROUND ART

Recently, technologies that provide many pieces of content using various multimedia devices continue to be developed. Furthermore, as technologies regarding storage media for storing content are advanced, a large amount of content has become able to be stored in a single device. Furthermore, content has become able to be provided from an external device through the Internet or over other communication networks in addition to the storage space of a device itself.

Accordingly, the amount of content that may be used through a single multimedia device has been rapidly increased. However, there is a problem in that it is difficult for a user to search many pieces of content for desired content.

Accordingly, there is a need for a technology through which a user may easily search many pieces of content for desired content.

Furthermore, there is a need for a scheme for immediately collecting pieces of content, found while several mobile services are used, without a complicated procedure.

DISCLOSURE

Technical Problem

The present invention has been made to solve the aforementioned problems, and an object of the present invention is to provide a system and method for providing content recommendation service, wherein pieces of content found while several mobile services are used can be immediately collected without a complicated procedure.

Another object of the present invention is to provide a system and method for providing content recommendation service, wherein when a keyword or the entire sentence is copied in a page, such as a browser or Social Networking Service (SNS) output to a user terminal, a content recommendation request signal including the copied keyword or entire sentence is transmitted to a service providing apparatus, and the service providing apparatus searches for pieces of content matched with the copied keyword or keywords included in the copied entire sentence and recommends the pieces of retrieved content to a user.

Yet another object of the present invention is to provide a system and method for providing content recommendation service, wherein users who manage content similar to content managed by a user are registered as followers, and the user can continue to be provided with the content of the followers.

Further another object of the present invention is to provide a system and method for providing content recommendation service, wherein pieces of content of followers can continue to be searched for and pieces of content having a taste similar to that of a user can be recommended to the user.

Yet another object of the present invention is to provide a system and method for providing content recommendation service, wherein when a user selects desired content from pieces of content output to a notification bar and executes the selected content, the selected content is automatically registered with a board corresponding to the type of the content, and content that may suit the user's taste can be consistently recommended through followers and registered with a corresponding board.

Technical Solution

In accordance with an aspect of the present invention for achieving the above objects, there is provided a system for providing content recommendation service, including a user terminal which sends a content recommendation request signal including a copied keyword to a service providing apparatus when the copying of the keyword is executed in a currently displayed page, receives pieces of content matched with the keyword from the service providing apparatus, displays the pieces of received content in a notification bar, and executes specific content and simultaneously registers the specific content with the board of a corresponding content type when the execution of the specific content of the pieces of displayed content is requested, and the service providing apparatus which obtains the pieces of content matched with the keyword by searching a content database included in the service providing apparatus when the content recommendation request signal is received from the user terminal and sends the pieces of obtained content to the user terminal.

The service providing apparatus may register users who manage content similar to content registered by a user as followers of the user and send content recommendation information including updated content to the user terminal if content of followers has been updated.

In accordance with another aspect of the present invention, there is provided a system for providing content recommendation service, including a user terminal which obtains pieces of content related to a keyword or pieces of predetermined content from pieces of previously stored content and displays the pieces of obtained content in a notification bar when the copying of the keyword is executed in a currently displayed page, sends a content recommendation request signal including the keyword to a service providing apparatus when the execution of specific content of the pieces of displayed content is requested, and displays content recommendation information while executing the specific content when the content recommendation information is received from the service providing apparatus, and the service providing apparatus which obtains pieces of content matched with the keyword by searching a content DB when the content recommendation request signal is received from the user terminal and sends the content recommendation information including the pieces of obtained content to the user terminal.

The service providing apparatus may search the content DB, may determine whether content matched with the keyword is present, may send content recommendation information including the matched content to the user terminal if content matched with the keyword is present, may select similar keywords that belong to similar keywords related to the keyword and that include content matched with the content DB if content matched with the keyword is not present, and may send a search word recommendation message including the selected similar keywords to the user terminal.

In accordance with another aspect of the present invention, there is provided a user terminal, including a communication unit for communication with a service providing apparatus over a communication network, an output unit which displays a page, a content recommendation request processing unit which sends a content recommendation request signal including a copied keyword to the service providing apparatus when the copying of the keyword is executed in a page displayed on the output unit, receives pieces of content matched with the keyword from the service providing apparatus, and displays the pieces of received content in a notification bar, and a content management unit which executes specific content and simultaneously registers the specific content with the board of a corresponding content type when the execution of the specific content of the pieces of content displayed in the notification bar is requested.

The user terminal may further include a storage unit in which pieces of content are stored and a text copy recognition processing unit which obtains pieces of content related to the keyword or pieces of predetermined content from the pieces of content stored in the storage unit when the copying of the keyword is executed in the page displayed on the output unit and displays the pieces of obtained content in the notification bar.

The content management unit may register pieces of content included in content recommendation information with the board of a corresponding content type when the content recommendation information including follower identification information and the pieces of content is received from the service providing apparatus.

The text copy recognition processing unit may notify the notification bar that the keyword has been copied to a clipboard when the copying of the keyword is executed.

The content recommendation request processing unit may notify the notification bar that the keyword has been copied to a clipboard when the copying of the keyword is executed.

Furthermore, when the copying of the entire sentence is executed in the page displayed on the output unit, the content recommendation request processing unit may send a content recommendation request signal including the copied entire sentence to the service providing apparatus and receive content recommendation information, including pieces of content matched with respective keywords included in the entire sentence, from the service providing apparatus.

Furthermore, when the content recommendation information is received, the content recommendation request processing unit may output a content recommendation information reception notification signal and display the content recommendation information in the notification bar or in a specific region of a screen in which the specific content is executed.

In accordance with yet another aspect of the present invention, there is provided a service providing apparatus, including a communication unit for communication with a user terminal over a communication network, a content database in which pieces of content are stored along with related keywords, a content search unit which searches the content database and determines whether content matched with a keyword is present when a content recommendation request signal including the keyword is received from the user terminal through the communication unit, and a content providing unit which obtains pieces of content matched with the keyword and provides the user terminal with content recommendation information including the pieces of obtained content if, as a result of the determination of the content search unit, content matched with the keyword is present.

The service providing apparatus may further include a user information database in which at least one of content preference information, content registration information, and follower information of each user is stored and a follower management unit which searches the user information database and registers users who manage content similar to content registered by a user or users who have similar content preference information as followers of the user.

If content of followers has been updated as a result of search for the user information database, the content providing unit may send content recommendation information including the updated content to the user terminal.

Furthermore, if, as a result of the determination of the content search unit, content matched with the keyword is not present, the content providing unit may select similar keywords that belong to similar keywords related to the keyword and that include content matched with the content DB and send a search word recommendation message, including the selected similar keywords, to the user terminal.

Furthermore, when a content recommendation request signal including a sentence is received from the user terminal, the content providing unit may analyze the sentence, extracts keywords, may re-extract keywords that belong to the extracted keywords and that are registered with the database, may obtain pieces of content matched with the respective re-extracted keywords by searching the database, and may send content recommendation information including the pieces of obtained content to the user terminal.

The service providing apparatus may further include a content registration processing unit which updates the user information DB with content registration information when the content registration information including content identification information is received from the user terminal through the communication unit.

In accordance with yet another aspect of the present invention, there is provided a method for providing content recommendation service, including a step of sending, by a user terminal, a content recommendation request signal including a copied keyword to a service providing apparatus when the copying of the keyword is executed in a currently displayed page, a step of obtaining, by the service providing apparatus, pieces of content matched with the keyword by searching a content database included in the service providing apparatus and sending the pieces of obtained content to the user terminal, a step of displaying, by the user terminal, the pieces of content received from the service providing apparatus in a notification bar, executing specific content and simultaneously registering the specific content with the board of a corresponding content type when the execution of the specific content of the pieces of displayed content is requested, and sending content registration information including specific content identification information to the service providing apparatus, and a step of registering, by the service providing apparatus, content corresponding to the specific content identification information with a user information database of a corresponding user.

There may be provided a method for providing content recommendation service, further including steps of sending, by the service providing apparatus, content recommendation information including updated content to the user terminal if content of followers has been updated as a result of search for a user information DB included in the service providing apparatus and registering, by the user terminal, the content included in the content recommendation information, with the board of a corresponding content type.

In accordance with yet another aspect of the present invention, there is provided a method for providing content recommendation service, including a step of obtaining, by a user terminal, pieces of content related to a keyword or pieces of predetermined content from pieces of previously stored content when the copying of the keyword is executed in a currently displayed page, displaying the pieces of obtained content in a notification bar, and sending a content recommendation request signal including the keyword to a service providing apparatus when the execution of specific content of the pieces of displayed content is requested, a step of obtaining, by the service providing apparatus, pieces of content matched with the keyword by searching a content DB included in the service providing apparatus and sending content recommendation information including the pieces of obtained content to the user terminal, and a step of displaying, by the user terminal, the content recommendation information while executing the specific content when the content recommendation information is received.

In accordance with yet another aspect of the present invention, there is provided a method for providing, by a user terminal, content recommendation service, including a step of sending a content recommendation request signal including a copied keyword to a service providing apparatus when the copying of the keyword is executed in a currently displayed page, receiving pieces of content matched with the keyword from the service providing apparatus, and displaying the pieces of received content in a notification bar and a step of executing specific content and simultaneously registering the specific content with the board of a corresponding content type when the execution of the specific content of the pieces of content displayed in the notification bar is requested and sending content registration information, including identification information of the specific content, to the service providing apparatus.

The method for providing content recommendation service may further include a step of registering pieces of content, included in content recommendation information, with the board of a corresponding content type when the content recommendation information including follower identification information and the pieces of content is received from the service providing apparatus.

In accordance with yet another aspect of the present invention, there is provided a method for providing, by a user terminal, content recommendation service, including a step of obtaining pieces of content related to a keyword or pieces of predetermined content from pieces of content stored in a storage unit and displaying the pieces of obtained content in a notification bar when the copying of the keyword is executed in a currently displayed page, a step of sending a content recommendation request signal including the keyword to the service providing apparatus when the execution of specific content of the pieces of displayed content is requested, and a step of displaying content recommendation information while executing the specific content when the content recommendation information is received from the service providing apparatus.

The method for providing content recommendation service may further include a step of sending a content recommendation request signal including a copied entire sentence to the service providing apparatus when the copying of the entire sentence is executed in the currently displayed page and a step of receiving content recommendation information, including pieces of content matched with respective keywords included in the entire sentence, from the service providing apparatus.

In accordance with yet another aspect of the present invention, there is provided a method for providing, by a service providing apparatus, content recommendation service, including a step of searching a content database included in the service providing apparatus and determining whether content matched with a keyword is present when a content recommendation request signal including the keyword is received from a user terminal and a step of sending content recommendation information including pieces of matched content to the user terminal if, as a result of the determination, content matched with the keyword is present, selecting similar keywords that belong to similar keywords related to the keyword and that comprise content matched with the content database if, as a result of the determination, content matched with the keyword is not present, and sending a search word recommendation message including the selected similar keywords to the user terminal.

The method for providing content recommendation service may further included a step of analyzing a sentence when a content recommendation request signal including the sentence is received from the user terminal, extracting keywords from the sentence, and re-extracting keywords that belong to the extracted keywords and that have been registered with the content database and a step of obtaining pieces of content matched with the re-extracted keywords by searching the database and sending content recommendation information including the pieces of obtained content to the user terminal In accordance with yet another aspect of the present invention, there is provided a recording medium on which a method for providing content recommendation service is recorded in a program form and which is readable by an electronic device, wherein the method includes a step of sending a content recommendation request signal including a copied keyword to a service providing apparatus when the copying of the keyword is executed in a currently displayed page, receiving pieces of content matched with the keyword from the service providing apparatus, and displaying the pieces of content in a notification bar and a step of executing specific content and simultaneously registering the specific content with the board of a corresponding content type when the execution of the specific content of the pieces of content displayed in the notification bar is requested and sending content registration information including identification information of the specific content to the service providing apparatus.

In accordance with yet another aspect of the present invention, there is provided a recording medium on which a method for providing content recommendation service is recorded in a program form and which is readable by an electronic device, wherein the method includes a step of obtaining pieces of content related to a keyword or pieces of predetermined content from pieces of content stored in a storage unit and displaying the pieces of obtained content in a notification bar when the copying of the keyword is executed in a currently displayed page, a step of sending a content recommendation request signal including the keyword to a service providing apparatus when execution of specific content of the pieces of displayed content is requested, and a step of displaying content recommendation information while executing the specific content when the content recommendation information is received from the service providing apparatus.

In accordance with yet another aspect of the present invention, there is provided a recording medium on which a method for providing content recommendation service is recorded in a program form and which is readable by an electronic device, wherein the method includes a step of searching an included database and determining whether content matched with a keyword is present when a content recommendation request signal including the keyword is received from a user terminal and a step of sending content recommendation information including pieces of matched content to the user terminal if, as a result of the determination, content matched with the keyword is present, selecting similar keywords that belong to similar keywords related to the keyword and that comprise content matched with the database if, as a result of the determination, content matched with the keyword is not present, and sending a search word recommendation message including the selected similar keywords to the user terminal.

Advantageous Effects

In accordance with the present invention, pieces of content found while several mobile services are used can be immediately collected without a complicated procedure.

Furthermore, there is an advantage in that a user does not need to perform a complicated procedure for searching for content because when a keyword or the entire sentence is copied in a page, such as a browser or SNS output to the user terminal, a content recommendation request signal including the copied keyword or entire sentence is transmitted to the service providing apparatus, and the service providing apparatus searches for pieces of content matched with the copied keyword or keywords included in the copied entire sentence and recommends the pieces of retrieved content to the user.

Furthermore, users who manage content similar to content managed by a user can be registered as followers, and the user can continue to be provided with the content of the followers.

Furthermore, pieces of content of followers can continue to be searched for, and pieces of content having a taste similar to that of a user can be recommended to the user.

Furthermore, when a user selects desired content from pieces of content output to a notification bar and executes the selected content, the selected content can be automatically registered with a board corresponding to the type of the content, and content that may suit the user's taste can be consistently recommended through followers and registered with a corresponding board.

<Description of reference numerals>

Figure 1:
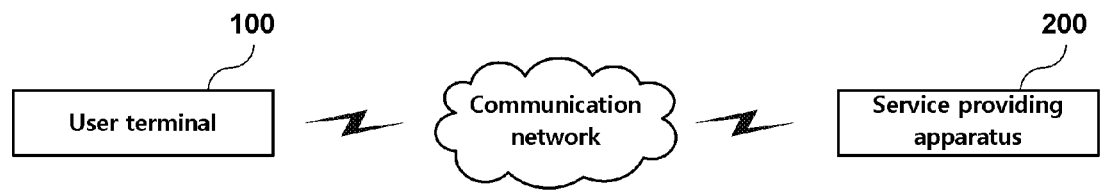
FIG. 1 is a diagram illustrating a system for providing content recommendation service in accordance with an embodiment of the present invention.

100: user terminal
110, 210: communication unit
120: input unit
130: output unit
140: storage unit
150: text copy recognition processing unit
160: content recommendation request processing unit
170: content management unit
200: service providing apparatus
220: database
222: content DB
224: user information DB
230: content search unit
240: content providing unit
250: content registration processing unit
260: follower management unit

MODE FOR INVENTION

The details of the objects and technical constructions of the present invention and corresponding acting effects will become more clearly understood from the following detailed description based on the drawings accompanied by the specification of the present invention.

FIG. 1 is a diagram illustrating a system for providing content recommendation service in accordance with an embodiment of the present invention.

Referring to FIG. 1, the system for providing content recommendation service includes a user terminal 100 and a service providing apparatus 200.

The user terminal 100 sends a content recommendation request signal, including a copied keyword, to the service providing apparatus 200 when the copying of the keyword is executed in a currently displayed page, receives pieces of content matched with the keyword from the service providing apparatus 200, and displays the pieces of received content in a notification bar. In this case, the pieces of content may be displayed in the notification bar in the form of an icon, a name, etc. The notification bar may be a notification center in which information about several types of programs pops up and which function as a text message or functions to count calls during absence.

Furthermore, when the execution of specific content of pieces of content displayed in the notification bar is requested, the user terminal 100 executes the specific content and at the same time, registers the specific content with the board of a content type to which the specific content belongs. In this case, the user terminal 100 sends content registration information, including specific content identification information, board identification information, etc., to the service providing apparatus 200. In response thereto, the service providing apparatus 200 registers the specific content with a board corresponding to the board identification information.

Furthermore, when the copying of a keyword is executed in a currently displayed page, the user terminal 100 obtains pieces of content related to the keyword or pieces of predetermined content from pieces of previously stored content and displays the pieces of obtained content in the notification bar. In this case, the currently displayed page may refer to news, a blog, SNS, a shopping page, etc., the content may include an application, commodities, memos, music, moving images, video, etc., and the pieces of content may be displayed in the form of an icon, a name, etc. The notification bar may be a notification center in which information about several types of programs pops up and which function as a text message or functions to count calls during absence.

Furthermore, when the execution of specific content of the pieces of content displayed in the notification bar is requested, the user terminal 100 sends a content recommendation request signal, including the keyword, to the service providing apparatus 200. When content recommendation information is received from the service providing apparatus 200, the user terminal 100 displays the content recommendation information while executing the specific content. In this case, pieces of content included in the content recommendation information may be displayed in the notification bar in the form of an icon, a name, etc. The icon or name has been linked to a content execution (or installation) page. Accordingly, when a user selects a specific content icon from the pieces of content displayed in the notification bar, the page of the specific content is accessed. Furthermore, the content recommendation information includes the address of the installation page of recommended content, the name of the recommended content, an address at which a list of pieces of the recommended content is displayed, a list of the pieces of recommended content, etc.

Furthermore, when the copying of the entire sentence is executed in a currently displayed page, the user terminal 100 sends a content recommendation request signal, including the copied entire sentence, to the service providing apparatus 200 and receives content recommendation information about pieces of content related to keywords, included in the entire sentence, from the service providing apparatus 200.

Such a user terminal 100 may be any user device on which a communication function and a short-distance communication function is mounted. For example, the user terminal 100 may include various devices, such as a laptop, a wireless communication terminal, a smart phone, a Portable Media Player (PMP), a Personal Digital Assistant (PDA), a tablet PC, a set-top box, and smart TV.

The user terminal 100 will be described in detail with reference to FIG. 2.

When a content recommendation request signal including a keyword is received from the user terminal 100, the service providing apparatus 200 obtains pieces of content matched with the keyword by searching a content database (DB) 222 included therein and sends the pieces of obtained content to the user terminal 100. In this case, the service providing apparatus 200 determines whether pieces of content matched with the keyword are present by searching the content DB 222. If pieces of content matched with the keyword are determined to be present, the service providing apparatus 200 sends content recommendation information, including the pieces of matched content, to the user terminal 100. If content matched with the keyword is determined to be not present, the service providing apparatus 200 changes the search word of the keyword and sends a search word recommendation message, including the keyword and the changed search word, to the user terminal 100.

Furthermore, the service providing apparatus 200 registers users who manage content similar to content registered by a user as followers of the user. If pieces of content of the followers are updated, the service providing apparatus 200 may send content recommendation information, including the updated content, to the user terminal 100. That is, the service providing apparatus 200 may determine the taste of a user based on at least one of the content preference information of the user and the content registration information of the user and register users who have tastes similar to the determined taste as followers of the user.

Furthermore, when a content recommendation request signal including a sentence is received from the user terminal 100, the service providing apparatus 200 analyzes the sentence, extracts keywords, and extracts keywords, registered with the content DB 222, from the extracted keywords. Thereafter, the service providing apparatus 200 may obtain pieces of content matched with the extracted keywords from the content DB 222 and send content recommendation information, including the pieces of obtained content, to the user terminal 100. In this case, the content recommendation information may include keywords and pieces of content matched with the respective keywords.

The service providing apparatus 200 will be described in detail with reference to FIG. 3.

Figure 2:
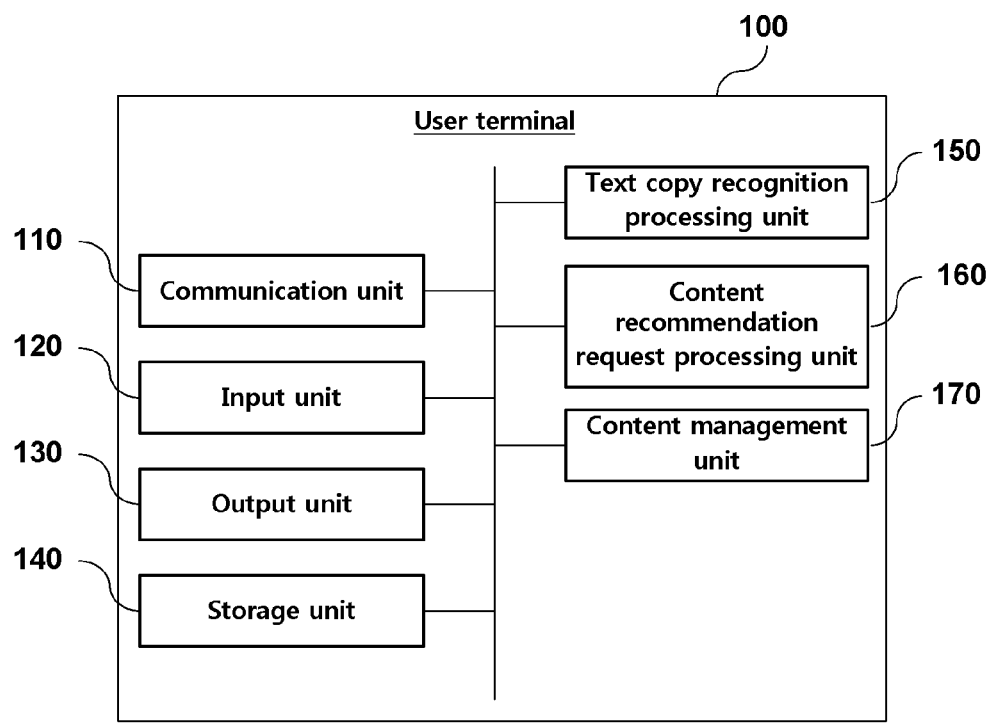
FIG. 2 is a block diagram schematically illustrating the configuration of a user terminal in accordance with an embodiment of the present invention.

FIG. 2 is a block diagram schematically illustrating the configuration of the user terminal in accordance with an embodiment of the present invention.

Referring to FIG. 2, the user terminal 100 includes a communication unit 110 sending and receiving data over a communication network, an input unit 120, an output unit 130, a storage unit 140, a text copy recognition processing unit 150, a content recommendation request processing unit 160, and a content management unit 170.

The communication unit 110 refers to communication means for interconnecting the user terminal 100 and the service providing apparatus over a communication network and may include a wireless communication module, such as mobile communication or satellite communication, a wired communication module, such as the Internet, and a short-distance wireless communication module, such as Wi-Fi.

The input unit 120 is means for receiving user requests for control of the operation of the user terminal 100, and it converts a request from a user into an electrical signal in response to a user manipulation. The input unit 120 refers to input means for receiving characters, numbers, text, sound, motions, tactile senses, visual senses, etc. from a user. The input means may be implemented in various forms using a keyboard, a keypad, a touch screen, visual detection means, tactile detection means, motion detection means, sound detection means.

The output unit 130 displays a WAP/WAP page. Furthermore, the output unit 130 refers to display means for displaying screen information according to the driving of an application. Such an output unit 130 is preferably implemented using a small-sized flat panel display, such as a Liquid Crystal Display (LCD) or Organic Light Emitting Diodes (OLED). The output unit 130 may be overlapped with the input unit 120 to form a touch screen form.

The storage unit 140 stores programs required when the operations of the user terminal 100 are controlled and data generated when the programs are executed.

Furthermore, the storage unit 140 stores pieces of content. In this case, the content may include applications, music, VOD, memos, etc.

Furthermore, the storage unit 140 stores a content recommendation application. In this case, the content recommendation application may be an application that receives recommended content corresponding to a keyword when the copying of the keyword is executed in a currently displayed page and that displays the recommended content in the notification bar.

When the copying of a keyword is executed in a page displayed on the output unit 130, the text copy recognition processing unit 150 obtains pieces of content related to the keyword or pieces of predetermined content from pieces of content stored in the storage unit 140 and displays the pieces of obtained content in the notification bar. In this case, when the copying of the keyword is executed, the text copy recognition processing unit 150 notifies the notification bar that the keyword has been copied to a clipboard. Furthermore, pieces of content, together with a keyword, may be displayed in the notification bar. The pieces of content displayed in the notification bar may include music, VOD, app stores, shopping, memos, search, etc. and may have a form, such as an icon or a list.

That is, when a user selects a keyword in a page displayed on the output unit 130 using a drag, etc., the text copy recognition processing unit 150 displays a command input window, including a copy command, a search command, a sharing command, etc., in a specific region of a current page. When the user selects the copy command, the text copy recognition processing unit 150 may obtain pieces of content that belong to pieces of content stored in the storage unit 140 and that are related to the selected keyword and display the pieces of obtained content in the notification bar.

Furthermore, when the copying of a keyword is executed, the text copy recognition processing unit 150 may output pieces of content, previously registered by a user, to the notification bar. In this case, the pieces of previously registered content may include services, applications, etc. that have been registered by the user in environment configurations and that are being used. When the copying of a keyword is executed in a page displayed on the output unit 130, the content recommendation request processing unit 160 sends a content recommendation request signal, including the copied keyword, to the service providing apparatus, receives pieces of content matched with the keyword from the service providing apparatus, and displays the pieces of content in the notification bar. In this case, the content recommendation request processing unit 160 notifies the notification bar that the keyword has been copied to a clipboard. Furthermore, the notification bar may display the pieces of content along with the keyword. The pieces of content displayed in the notification bar include music, VOD, app stores, shopping, memos, search, etc., and may be displayed in the form of an icon, a name, a list, etc.

That is, when a user selects a keyword in a page displayed on the output unit 130 using a drag, etc., the content recommendation request processing unit 160 displays a command input window, including a copy command, a search command, a sharing command, etc., in a specific region of a current page. When the user selects the copy command, the content recommendation request processing unit 160 sends a content recommendation request signal, including the selected keyword, to the service providing apparatus 200 through the communication unit 110. Thereafter, when content recommendation information is received from the service providing apparatus 200, the content recommendation request processing unit 160 may output a content recommendation information reception notification signal. The content recommendation information reception notification signal may be output in the form of sound, vibration, a message, etc. A user who has checked such content recommendation information reception notification may check pieces of content related to the keyword through the notification bar.

Furthermore, when the execution of specific content of the pieces of content displayed in the notification bar is requested, the content recommendation request processing unit 160 sends a content recommendation request signal, including the keyword, to the service providing apparatus. When content recommendation information is received from the service providing apparatus, the content recommendation request processing unit 160 executes the specific content and at the same time, displays the received content recommendation information. In this case, when the content recommendation information is received, the content recommendation request processing unit 160 may output a content recommendation information reception notification signal while executing the specific content. In this case, the content recommendation information reception notification signal may be output in the form of vibration, a message, voice, etc. A user who has checked such content recommendation information reception notification may check the content recommendation information while executing the specific content. The content recommendation information may be displayed in the notification bar or a specific region of a screen in which the specific content is executed. For example, the content recommendation request processing unit 160 may display the content recommendation information in a predetermined, specific region, such as the lower side, upper side, left, or right of the screen in which the specific content is executed, using various methods, such as a pop-up method, an overlay method, and a screen partition method.

Furthermore, when the copying of the entire sentence is executed in a page displayed on the output unit 130, the content recommendation request processing unit 160 sends a content recommendation request signal, including the copied entire sentence, to the service providing apparatus and receives content recommendation information, including pieces of content related to keywords included in the entire sentence, from the service providing apparatus. In this case, the content recommendation request processing unit 160 may output a content recommendation information reception notification signal that provides notification of the reception of the content recommendation information.

Furthermore, when first content is selected from content recommendation information that is displayed in the notification bar or in a specific region of a screen in which specific content is executed, the content recommendation request processing unit 160 may execute the first content or may connect to the installation page of the first content.

When the execution of specific content of pieces of content displayed in the notification bar is requested, the content management unit 170 executes the specific content and at the same time, registers the specific content with the board of a content type to which the specific content belongs.

That is, when the execution of the specific content is requested, the content management unit 170 determines that the specific content corresponds to which content type, such as a movie, game, or music, and registers the specific content with a board corresponding to the determined content type. In this case, the content management unit 170 determines whether a board corresponding to the determined content type is present. If a board corresponding to the determined content type is determined to be present, the content management unit 170 may register the specific content with the corresponding board. If a board corresponding to the determined content type is determined to be not present, the content management unit 170 may generate the board of the corresponding content type and register the specific content with the generated board.

Furthermore, when follower identification information and content recommendation information including pieces of content are received from the service providing apparatus, the content management unit 170 may register the pieces of content with the board of a corresponding content type. That is, the content management unit 170 may receive pieces of content of followers who manage content similar to content managed by a user from the service providing apparatus through recommendation.

Figure 3:
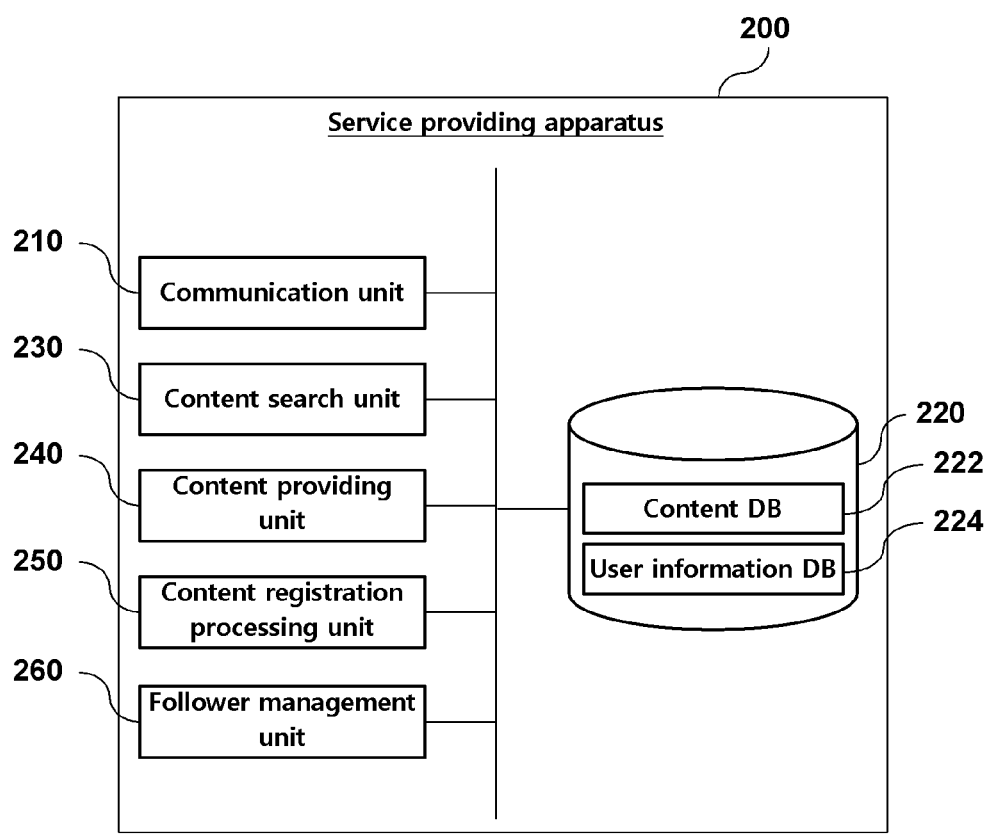
FIG. 3 is a block diagram schematically illustrating the configuration of a service providing apparatus in accordance with an embodiment of the present invention.

FIG. 3 is a block diagram schematically illustrating the configuration of the service providing apparatus in accordance with an embodiment of the present invention.

Referring to FIG. 3, the service providing apparatus 200 includes a communication unit 210 for communication with the user terminal over a communication network, a database 220, a content search unit 230, a content providing unit 240, a content registration processing unit 250, and a follower management unit 260.

The database 220 includes the content DB 222 and a user information DB 224.

The content DB 222 stores pieces of content along with related keywords. That is, pieces of content mapped to related keywords are stored in the content DB 222. In this case, the keyword may include a description of content, the contents of the content, a term representative of the content, etc.

The user information DB 224 stores identification information of users who have become members and content preference information, content registration information, follower information, etc. corresponding to corresponding identification information. In this case, the user identification information may be user terminal identification information, an ID/password, etc. The content preference information may be information set based on pieces of content registered by a user or may be information registered by a user. The content preference information may be set based on each content type, such as preference movie information or preference music information. The follower information may be information about users who manage content similar to content registered by a user or about users who have similar content preference information.

When a content recommendation request signal including a keyword is received from the user terminal through the communication unit 210, the content search unit 230 searches the content DB 222 and determines whether content matched with the keyword is present.

When a content recommendation request signal including a keyword is received from the user terminal through the communication unit 210, the content providing unit 240 obtains pieces of content matched with the keyword by searching the content DB 222 and provides the user terminal with content recommendation information including the pieces of obtained content. In this case, the content recommendation information may be a content list, and the content list may have a form, such as an icon, a list, or an URL.

Furthermore, if content matched with the keyword is not present as a result of the determination of the content search unit 230, the content providing unit 240 changes the keyword and sends a search word recommendation message, including the changed keyword and the keyword prior to the changed keyword, to the user terminal. That is, if content matched with the keyword is not present, the content providing unit 240 extracts similar keywords that are similar to the keyword prior to the changed keyword using a term dictionary included in the content providing unit 240. Thereafter, the content providing unit 240 may send a search word recommendation message including the extracted similar keywords. In this case, the content providing unit 240 may not include a similar keyword that belongs to the extracted similar keywords and that does not include content matched with pieces of content stored in the content DB 222 in the search word recommendation message. Furthermore, if content matched with the keyword is not present, the content providing unit 240 may send a content non-existence message to the user terminal.

Furthermore, if pieces of content of followers have been updated after searching the user information DB 224, the content providing unit 240 may send content recommendation information, including the pieces of updated content, to the user terminal. That is, if there is a follower who belongs to the followers of a corresponding user and who has updated content after searching the user information DB 224, the content providing unit 240 may recommend the updated content of the corresponding follower to a user.

Furthermore, the content providing unit 240 checks preference content information, corresponding to user identification information, by searching the user information DB 224 and selects users who have the checked preference content information as followers. Thereafter, if content of the selected followers has been updated, the content providing unit 240 may send content recommendation information, including the updated content, to the user terminal.

Furthermore, the content providing unit 240 may determine a user's taste based on at least one of the preference content information of the user and the content information registered by the user by searching the user information DB 224, may obtain pieces of content corresponding to the determined taste from the content DB 222, and may provide the pieces of content to the user terminal.

When content registration information including content identification information is received from the user terminal through the communication unit 210, the content registration processing unit 250 updates the user information DB 224 with the content registration information.

The follower management unit 260 searches the user information DB 224 and registers users who manage content similar to content registered by a user or users who have similar content preference information as the followers of the user.

That is, the follower management unit 260 determines the preference content information of a corresponding user based on the content registration information of a user who becomes a member, searches the user information DB 224, and registers users who have preference content similar to that of the user as followers.

Furthermore, if the preference content information of each of users has been received (or stored), the follower management unit 260 searches the user information DB 224 and registers users who have preference content similar to that of the user as the followers of the user.

Figure 4:
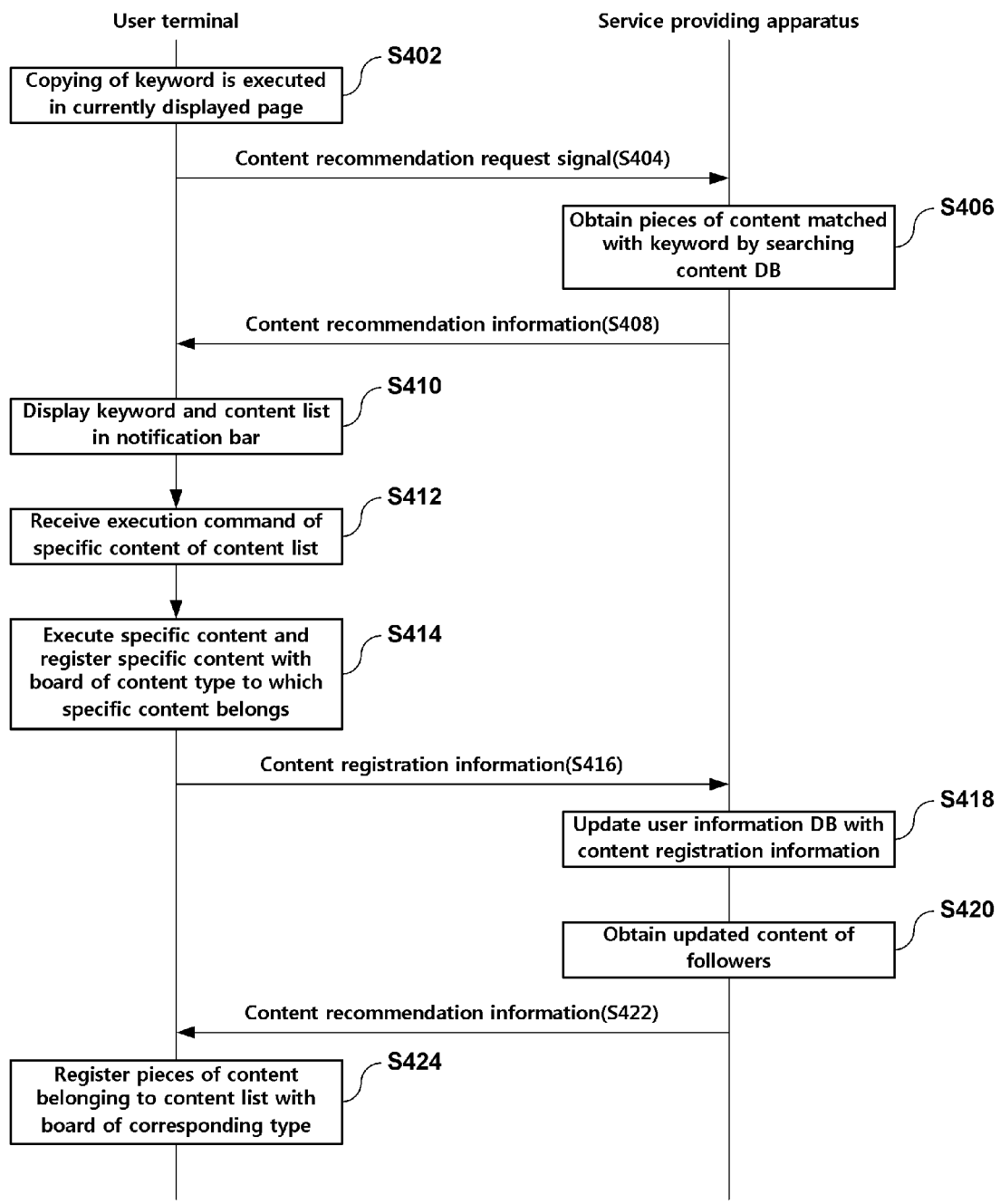
FIG. 4 is a diagram illustrating a method for providing content recommendation service in accordance with a first embodiment of the present invention.

FIG. 4 is a diagram illustrating a method for providing content recommendation service in accordance with a first embodiment of the present invention.

Referring to FIG. 4, when the copying of a keyword is executed in a currently displayed page (S402), the user terminal sends a content recommendation request signal, including the copied keyword, to the service providing apparatus (S404). In this case, the user terminal may notify the notification bar that the keyword has been copied to a clipboard. When step S404 is executed, the service providing apparatus obtains pieces of content matched with the keyword by searching the content DB (S406) and sends content recommendation information, including the pieces of obtained content, to the user terminal (S408). In this case, the service providing apparatus determines whether content matched with the keyword is present in the content DB. If content matched with the keyword is present in the content DB, the service providing apparatus may send the content recommendation information, including the pieces of content, to the user terminal. If content matched with the keyword is not present in the content DB, the service providing apparatus may send a content non-existence message to the user terminal.

When step S408 is executed, the user terminal displays the keyword and the pieces of content, included in the content recommendation information, in the notification bar (S410). In this case, the user terminal may output a content recommendation information reception notification signal that provides notification of the reception of the content recommendation information. Furthermore, the user terminal may display the pieces of content in the notification bar in a form, such as an icon or a list.

When the execution command of specific content of the pieces of content displayed in the notification bar is received (S412), the user terminal executes the specific content and registers the specific content with the board of a content type to which the specific content belongs (S414).

After step S414 is executed, the user terminal sends content registration information, including user identification information, specific content identification information, the type of board, etc., to the service providing apparatus (S416). The service providing apparatus updates the user information DB with the content registration information (S418).

Thereafter, if content of followers has been updated (S420), the service providing apparatus sends content recommendation information, including the updated content, to the user terminal (S422).

In response thereto, the user terminal displays the content recommendation information, received from the service providing apparatus, in the notification bar (S424). A subsequent process corresponds to step S412, and thus a description thereof is omitted.

Figure 5:
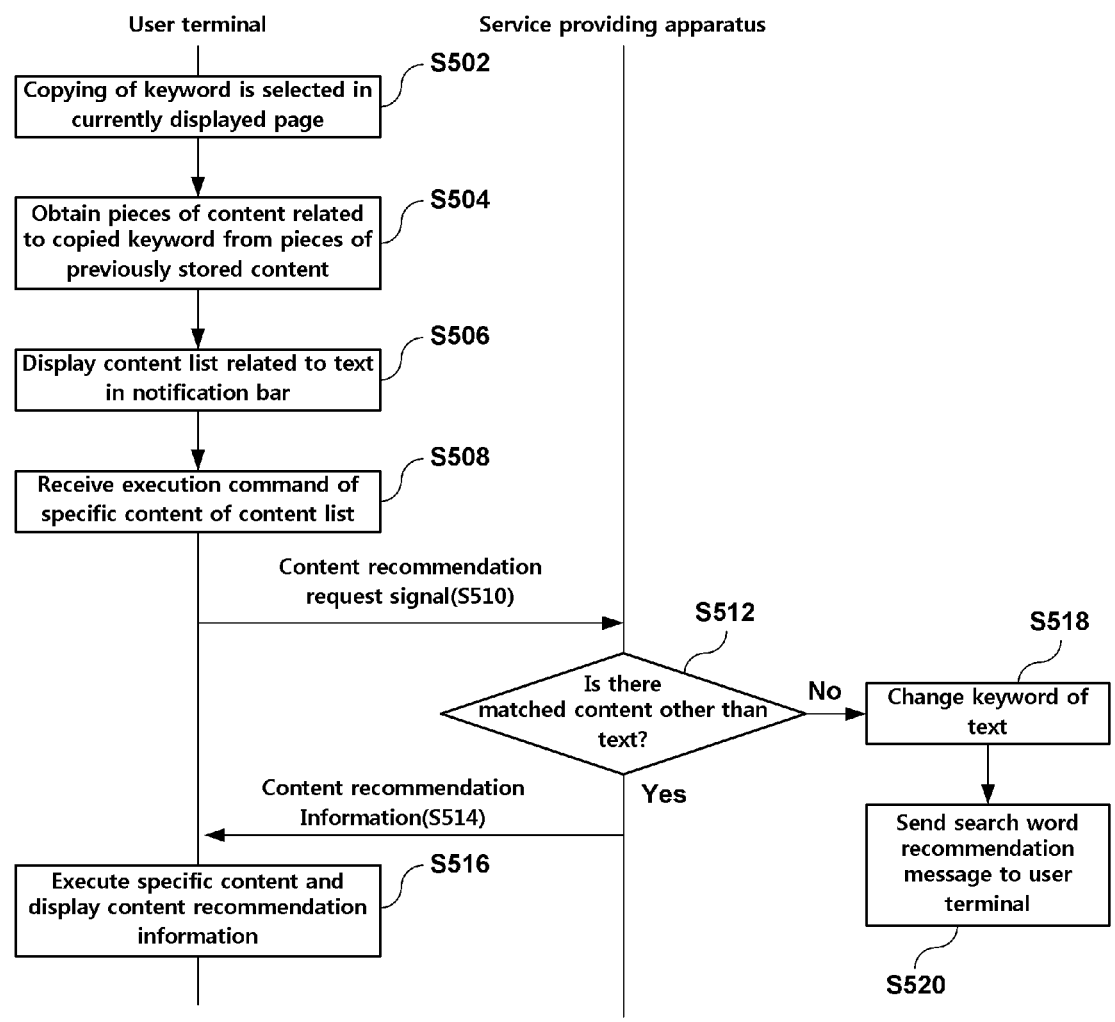
FIG. 5 is a diagram illustrating a method for providing content recommendation service in accordance with a second embodiment of the present invention.

FIG. 5 is a diagram illustrating a method for providing content recommendation service in accordance with a second embodiment of the present invention.

Referring to FIG. 5, when the copying of a keyword is executed in a currently displayed page (S502), the user terminal obtains pieces of content related to the keyword or pieces of predetermined content from pieces of content stored in the storage unit (S504) and displays the pieces of obtained content in the notification bar along with the keyword (S506). In this case, the user terminal may notify the notification bar that the keyword has been copied to a clipboard. Furthermore, the user terminal may display the pieces of obtained content in the notification bar in a form, such as an icon or a list.

After step S506 is executed, when a user selects specific content from the pieces of content displayed in the notification bar and inputs an execution command (S508), the user terminal sends a content recommendation request signal, including the copied keyword, to the service providing apparatus (S510).

The service providing apparatus searches the database included therein and determines whether content matched with the keyword is present (S512).

If, as a result of the determination at step S512, content matched with the keyword is present in the database, the service providing apparatus sends content recommendation information, including pieces of corresponding content, to the user terminal (S514). In this case, the content recommendation information may have an icon, list, or URL form for the content.

When the content recommendation information is received from the service providing apparatus, the user terminal displays the content recommendation information while executing the specific content (S516). In this case, the user terminal may output a content recommendation information reception notification signal and display the content recommendation information in the notification bar.

If, as a result of the determination at step S512, content matched with the keyword is not present in the database, the service providing apparatus changes the keyword (S518) and sends a search word recommendation message, including the changed keyword and the keyword prior to the changed keyword, to the user terminal (S512).

That is, if content matched with the keyword is not present, the service providing apparatus extracts similar keywords similar to the keyword using a term dictionary included therein. Thereafter, the service providing apparatus may send a search word recommendation message including the extracted similar keywords. In this case, the service providing apparatus may not include similar keywords that belong to the extracted similar keywords and that do not have content matched with the database in the search word recommendation message. When a user who has received the search word recommendation message selects the changed keyword, the user terminal may execute step S510.

Figure 6:
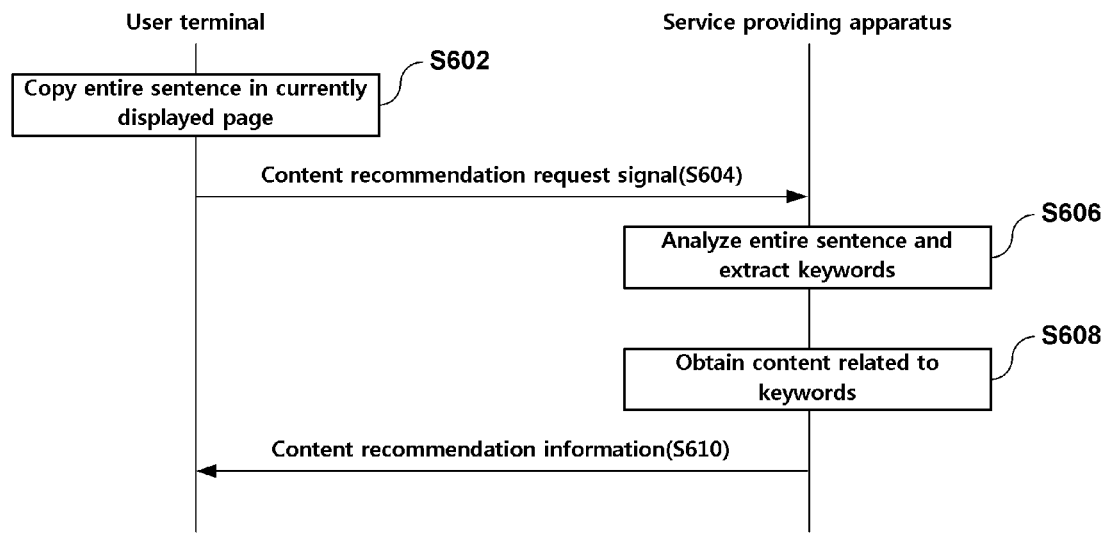
FIG. 6 is a diagram illustrating a method for providing content recommendation service in accordance with a third embodiment of the present invention.

FIG. 6 is a diagram illustrating a method for providing content recommendation service in accordance with a third embodiment of the present invention.

Referring to FIG. 6, when the copying of the entire sentence is executed in a currently displayed page (S602), the user terminal sends a content recommendation request signal, including the copied entire sentence, to the service providing apparatus (S604).

The service providing apparatus analyzes the entire sentence included in the content recommendation request signal and extracts keywords (S606) and obtains pieces of content, corresponding to the respective extracted keywords, by searching the database included therein (S608).

Thereafter, the service providing apparatus sends content recommendation information, including the pieces of obtained content, to the user terminal (S610). That is, the service providing apparatus analyzes a received sentence, extracts keywords, and extracts keywords that belong to the extracted keywords and that are registered with the database. In this case, the service providing apparatus may extract the keywords from the sentence using a method, such as text mining, metadata analysis, or morpheme analysis. Thereafter, the service providing apparatus obtains pieces of content matched with the extracted keywords by searching the database and sends content recommendation information, including the pieces of obtained content, to the user terminal.

The user terminal displays the received content recommendation information in the notification bar. A user may select desired content from the pieces of content output to the notification bar and execute the selected content.

A user can immediately collect pieces of content, found while using several mobile services, without a complicated procedure through such a process.

A method of recommending content to a user through the copying of a keyword is described with reference to FIG. 7.

Figure 7A:
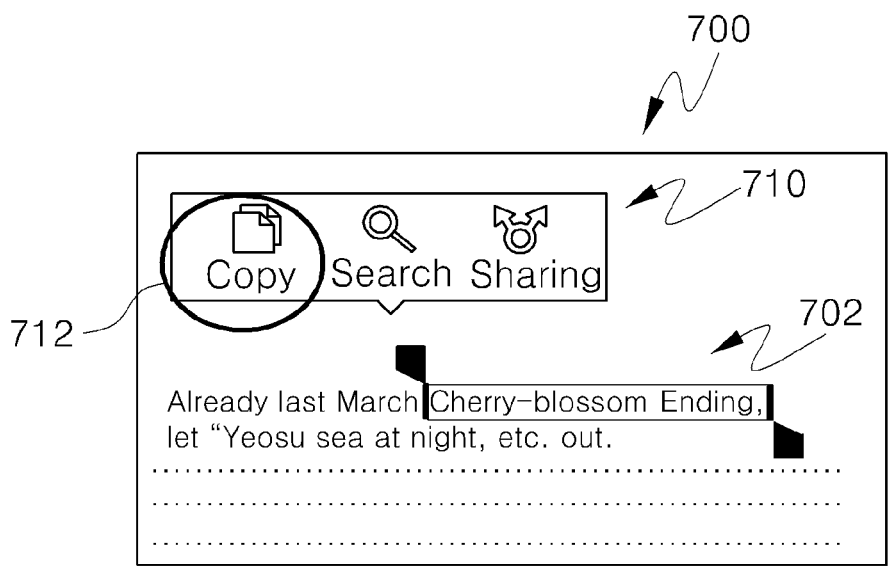
FIG. 7 is an exemplary diagram illustrating a content recommendation method in accordance with an embodiment of the present invention.
Figure 7B:
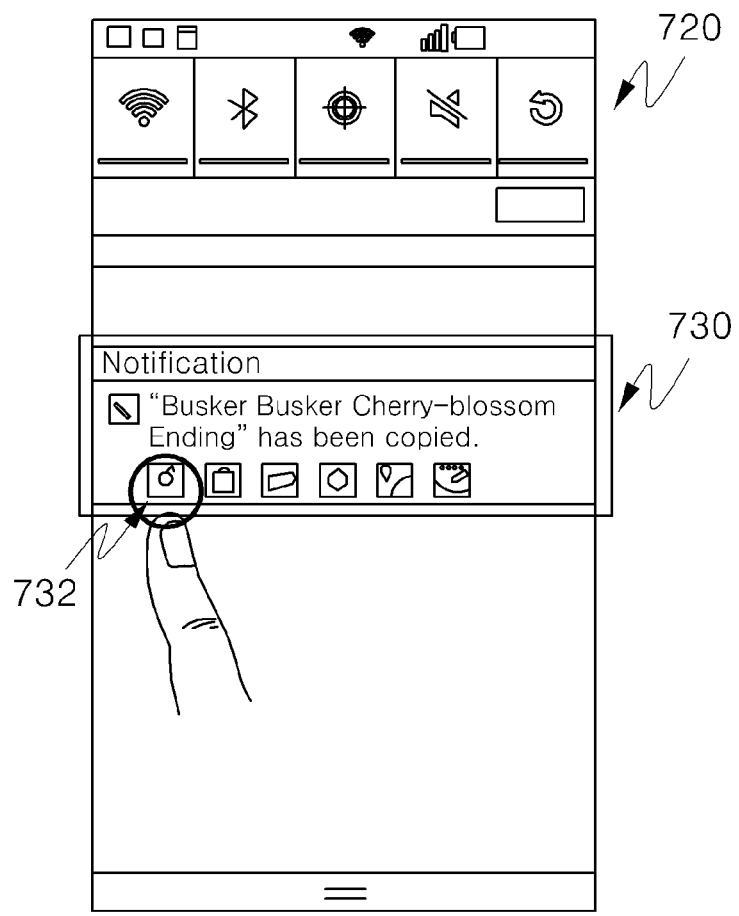

When a user selects "Cherry-blossom Ending" 702 in a page 700, such as FIG. 7a, the user terminal displays a command input window 710 including a copy command, a search command, and a sharing command. When the user selects a copy command 712 in the command input window 710, the user terminal may receive content recommendation information from the service providing apparatus and display the content recommendation information in the notification bar 720, as in FIG. 7b. Referring to FIG. 7b, the notification bar 720 displays that "Busker Busker Cherry-blossom Ending" has been copied. Furthermore, the notification bar 720 displays the icon 730 of pieces of content related to "Busker Busker Cherry-blossom Ending".

Figure 7C:
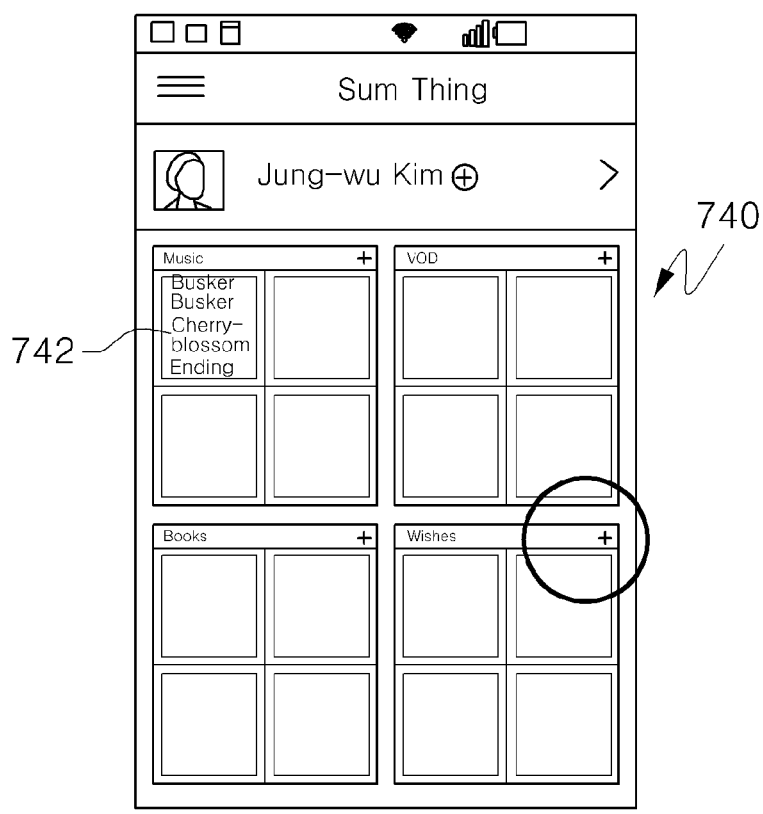

When a melon icon 732 is selected from the pieces of content related to "Busker Busker Cherry-blossom Ending" displayed in the notification bar 720, the user terminal registers "Busker Busker Cherry-blossom Ending" with a "Music" board (742), as in FIG. 7c.

Figure 7D:
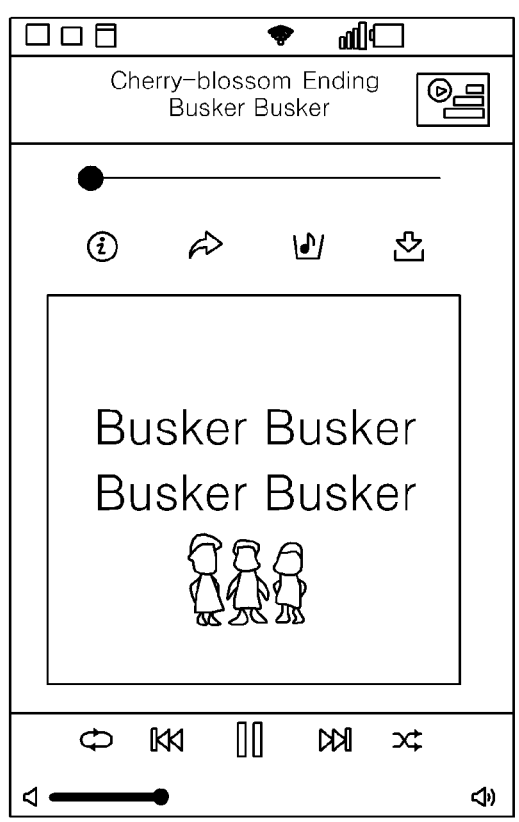

Furthermore, when the melon icon 732 is selected from the pieces of content related to "Busker Busker Cherry-blossom Ending" displayed in the notification bar, the user terminal may play back "Busker Busker Cherry-blossom Ending" as in FIG. 7d.

Meanwhile, in accordance with another aspect of the present invention, there is provided a recording medium which is readable by an electronic device and on which a method for providing content recommendation service has been recorded in a program form, wherein the method includes a step of sending a content recommendation request signal including a copied keyword to the service providing apparatus when the copying of the keyword is executed in a currently displayed page, receiving pieces of content matched with the keyword from the service providing apparatus, and displaying the pieces of content in the notification bar and a step of executing specific content and simultaneously registering the specific content with the board of a corresponding content type when the execution of the specific content of the pieces of content displayed in the notification bar is requested and sending content registration information including identification information of the specific content to the service providing apparatus.

Furthermore, in accordance with another aspect of the present invention, there is provided a recording medium which is readable by an electronic device and on which a method for providing content recommendation service has been recorded in a program form, wherein the method includes a step of obtaining pieces of content matched with a keyword by searching the content DB when a content recommendation request signal including the keyword is received from the user terminal, a step of sending content recommendation information including the pieces of obtained content to the user terminal, and a step of when content registration information including user identification information and content identification information is received from the user terminal, updating the user information DB with the content registration information and if content of followers has been updated as a result of search for the user information DB, sending content recommendation information including the updated content to the user terminal.

Furthermore, in accordance with another aspect of the present invention, there is provided a recording medium which is readable by an electronic device and on which a method for providing content recommendation service has been recorded in a program form, wherein the method includes a step of obtaining pieces of content related to a keyword or pieces of predetermined content from pieces of content stored in the storage unit and displaying the pieces of obtained content in the notification bar when the copying of the keyword is executed in a currently displayed page, a step of sending a content recommendation request signal including the keyword to the service providing apparatus when the execution of specific content of the pieces of displayed content is requested, and a step of displaying content recommendation information while executing the specific content when the content recommendation information is received from the service providing apparatus.

Furthermore, in accordance with another aspect of the present invention, there is provided a recording medium which is readable by an electronic device and on which a method for providing content recommendation service has been recorded in a program form, wherein the method includes a step of searching the content DB and determining whether content matched with a keyword is present when a content recommendation request signal including the keyword is received from the user terminal and a step of sending content recommendation information including pieces of matched content to the user terminal if, as a result of the determination, content matched with the keyword is present, selecting similar keywords that belong to similar keywords related to the keyword and that include content matched with the content DB if, as a result of the determination, content matched with the keyword is not present, and sending a search word recommendation message including the selected similar keywords to the user terminal.

Such a method for providing content recommendation service may be written in a program form, and codes and code segments that form the program may be easily reasoned by a programmer to which the present invention pertains.

Furthermore, the program related to the method for providing content recommendation service may be stored in information storage media readable by an electronic device (readable media) and may be read and executed by an electronic device.

As described above, those skilled in the art to which the present invention pertains will understand that the present invention may be implemented in other various forms without departing from the technical spirit or essential characteristics of the present invention. Accordingly, the aforementioned embodiments should not be construed as being limitative, but should be construed as being only illustrative from all aspects. Furthermore, the scope of the present invention is defined by the appended claims rather than by the detailed description. It should be understood that all modifications or variations derived from the meanings and scope of the present invention and equivalents thereof are included in the scope of the present invention.

INDUSTRIAL APPLICABILITY

The present invention may be applied to a system and method for providing content recommendation service, wherein pieces of content found while using several mobile services can be immediately collected without a complicated procedure in such a manner that when a keyword is copied in a page, such as a browser or SNS output to the user terminal, a content recommendation request signal including the copied keyword is transmitted to the service providing apparatus and the service providing apparatus searches pieces of content matched with the keyword and recommends the pieces of retrieved content to a user.

The invention claimed is:

1. A service providing apparatus, comprising:
a processor, and
a non-transitory computer readable storage media storing instructions thereon, the instructions when executed by the processor cause the processor to:
communicate with a user terminal over a communication network,
store pieces of content with related keywords in a content database,
store, in a user information database, content preference information, content registration information, and follower information of each user,
register, based on searching the user information database, users who manage content similar to content registered by a user or users who have similar content preference information as followers of the user,
determine whether content matched with a keyword present by searching the content database when a content recommendation request signal comprising the keyword is received automatically from the user terminal responsive to selecting the keyword on the user terminal by at least performing a dragging operation on the keyword displayed on a page of information displayed on the user terminal, and
obtain pieces of content matched with the keyword and provides the user terminal with content recommendation information comprising the pieces of obtained content when, if, as a result of the determination of the content search program code, content matched with the keyword is present,
wherein the content registration information indicates the registered content of each user, and is updated so that a specific content is newly registered for each user simultaneously with executing the specific content in response to a request for executing the specific content from each user, and
wherein when the content registration information of followers has been updated as a result of searching the user information database, the content providing program code sends content recommendation information comprising updated content, newly registered in the updated content registration information, to the user terminal, where the updated content comprises at least one of a video, a game, or a piece of music.

2. The service providing apparatus of claim 1, wherein when a content recommendation request signal comprising a sentence is received from the user terminal, the content providing program code analyzes the sentence, extracts keywords, re-extracts keywords that belong to the extracted keywords and that are registered with the database, obtains pieces of content matched with the respective re-extracted keywords by searching the database, and sends content recommendation information comprising the pieces of obtained content to the user terminal.

3. A computer readable storage media storing computer executable program code that, when executed by one or more processors, cause the one or more processors to:
receive a content recommendation request signal including a keyword automatically from a user terminal responsive to a user selecting the keyword on the user terminal by performing at least a dragging operation on the keyword displayed on a page of information displayed on the user terminal,
search a database included in a service providing apparatus and determines whether content matched with a keyword is present when a content recommendation request signal comprising the keyword is received from a user terminal,
send content recommendation information comprising pieces of matched content to the user terminal when, as a result of the determination, content matched with the keyword is present,
select similar keywords that belong to similar keywords related to the keyword and that comprise content matched with the database when, as a result of the determination, content matched with the keyword is not present, and
send a search word recommendation message comprising the selected similar keywords to the user terminal,
register, based on searching a user information database, users who manage content similar to content registered by a user or users who have similar content preference information as followers of the user,
wherein the user information database stores content registration information indicating the registered content of each user,
wherein the content registration information is updated so that a specific content is newly registered for each user simultaneously with executing the specific content in response to a request for executing the specific content from each user, and
wherein when the content registration information of followers has been updated as a result of searching the user information database, the program code sends content recommendation information comprising updated content, newly registered in the updated content registration information, to the user terminal, where the updated content comprises at least one of a video, a game, or a piece of music.

4. The computer readable storage media of claim 3, wherein the computer executable program code further causes the one or more processors to:
analyze a sentence when a content recommendation request signal comprising the sentence is received from the user terminal,
extract keywords from the sentence,
re-extract keywords that belong to the extracted keywords and that have been registered with the database,
obtain pieces of content matched with the re-extracted keywords by searching the database, and
send content recommendation information comprising the pieces of obtained content to the user terminal.

5. A method comprising:
displaying a page of information on a user terminal, the page of information including a keyword;
receiving, from a user, selection of the keyword on the user terminal by performing a dragging operation on the keyword on the page of information displayed on the user terminal;
receiving, from the user, a copy command, responsive to receiving the selection of the keyword;
automatically performing an operation to determine content items matching the keyword by searching a content database responsive to receiving the copy command;
receiving, from the user, selection of one of the content items determined to match the keyword;
registering the selected content item with a board corresponding to a type of the selected content item, responsive to receiving selection of the one of the content items; and presenting the selected content item to the user responsive to receiving the selection of the one of the content items.

\* \* \* \* \*